(12) United States Patent
Hoffmann et al.

(10) Patent No.: US 9,604,532 B2
(45) Date of Patent: Mar. 28, 2017

(54) WORK MACHINE, IN PARTICULAR DUMP TRUCK OR TRUCK

(71) Applicant: Liebherr-Mining Equipment Colmar SAS, Colmar (FR)

(72) Inventors: Sebastien Nicolas Hoffmann, Colmar (FR); Kai Kugelstadt, Lahr (DE); Burkhard Richthammer, Freiburg (DE)

(73) Assignee: Liebherr-Mining Equipment Colmar SAS, Colmar (FR)

( * ) Notice: Subject to any disclaimer, the term of this patent is extended or adjusted under 35 U.S.C. 154(b) by 0 days.

(21) Appl. No.: 14/730,556

(22) Filed: Jun. 4, 2015

(65) Prior Publication Data

US 2015/0352943 A1    Dec. 10, 2015

(30) Foreign Application Priority Data

Jun. 5, 2014    (DE) .................. 10 2014 008 345

(51) Int. Cl.
| | |
|---|---|
| *B60K 11/02* | (2006.01) |
| *B60K 6/46* | (2007.10) |
| *B60K 7/00* | (2006.01) |
| *B60K 17/04* | (2006.01) |
| *B60K 1/00* | (2006.01) |

(52) U.S. Cl.
CPC .............. *B60K 11/02* (2013.01); *B60K 6/46* (2013.01); *B60K 7/0007* (2013.01); *B60K 17/046* (2013.01); *B60K 2001/003* (2013.01); *B60K 2007/0038* (2013.01); *B60K 2007/0092* (2013.01); *B60Y 2200/142* (2013.01); *Y02T 10/6217* (2013.01); *Y10S 903/902* (2013.01)

(58) Field of Classification Search
CPC ...... B60K 11/02; B60K 7/0007; B60K 17/04; B60K 17/043; B60K 17/046; B60K 2001/003; B60K 2001/005; B60K 2001/006; B60K 2007/0038; B60K 2007/0092
USPC .............................................. 180/65.21, 68.4
See application file for complete search history.

(56) References Cited

U.S. PATENT DOCUMENTS

| | | | | |
|---|---|---|---|---|
| 4,325,451 | A * | 4/1982 | Umeda ................... | B60K 6/40 180/294 |
| 7,455,136 | B2 * | 11/2008 | Pleune .................. | B60K 11/04 165/41 |
| 8,215,427 | B2 * | 7/2012 | Rouaud ................... | B60K 6/26 180/65.27 |
| 8,613,305 | B2 * | 12/2013 | Yu ...................... | B60H 1/00492 123/41.14 |

(Continued)

FOREIGN PATENT DOCUMENTS

| | | |
|---|---|---|
| DE | 60122992 T2 | 3/2007 |
| DE | 102012217101 A1 | 6/2014 |

(Continued)

*Primary Examiner* — John Walters
(74) *Attorney, Agent, or Firm* — John D. Russell (57) ABSTRACT

The present disclosure relates to a mobile work machine, in particular in the form of a dump truck or truck, comprising a diesel electric traction drive and a cooling system, wherein a common cooling circuit of the liquid cooling medium is provided for the parallel cooling of one or more components of the power electronics and for the cooling of one or more drive components in the region of the driven vehicle axle.

21 Claims, 5 Drawing Sheets

(56) References Cited

U.S. PATENT DOCUMENTS

| | | | |
|---|---|---|---|
| 8,639,404 B2 * | 1/2014 | Sugiyama | B60K 6/12 701/22 |
| 8,704,401 B2 | 4/2014 | Kato et al. | |
| 9,180,753 B2 * | 11/2015 | Kim | B60H 1/00885 |
| 2006/0048984 A1 | 3/2006 | Pleune et al. | |
| 2008/0251303 A1 | 10/2008 | Rouaud et al. | |
| 2012/0130576 A1 | 5/2012 | Sugiyama et al. | |

FOREIGN PATENT DOCUMENTS

| | | |
|---|---|---|
| EP | 1197644 A1 | 4/2002 |
| WO | 2013110677 A2 | 8/2013 |
| WO | 2014044481 A1 | 3/2014 |

* cited by examiner

WORK MACHINE, IN PARTICULAR DUMP TRUCK OR TRUCK

CROSS REFERENCE TO RELATED APPLICATION

This application claims priority to German Patent Application No. 10 2014 008 345.4, entitled "Work Machine, in Particular Dump Truck or Truck" filed on Jun. 5, 2014, the entire contents of which is hereby incorporated by reference in its entirety for all purposes.

TECHNICAL FIELD

The present disclosure relates to a mobile work machine, in particular in the form of a dump truck or of a truck, comprising a diesel electric traction drive and a cooling system.

BACKGROUND AND SUMMARY

Dump trucks or so-called large dump trucks are predominantly used in coal mining operations or ore mining operations for the transport of the mined coal, minerals and ores. These bulk material dumpers are manufactured in sizes of more than 90 metric tons (t) up to several 100 t in weight and payload so that they have very large dimensions overall.

A diesel electric drive is used as the traction drive, wherein the mechanical energy generated by a diesel engine is converted with the aid of a generator into electrical energy for the supply of the electric traction drives. The reason for this process is that diesel engines, like all internal combustion engines, can only be operated with ideal efficiency in a very restricted speed range and cannot be started under load. The AC motors for the driving axle which are used can also produce the desired torque in the lower speed range for starting. The internal combustion engine used can be operated continuously in the ideal speed range.

Various components of the fraction drive requiring cooling were previously cooled by means of separate cooling systems, which results in a not insubstantial effort in the production of such dump trucks caused by the construction.

To make matters worse, the cooler inlet of the mobile work machine is typically seated in the region of the vehicle front, but the components to be cooled in the diesel electric drives used are rather arranged in the rear region. The transmission oil to be cooled is currently conducted from the vehicle rear in the direction of the heat exchangers mounted at the vehicle front to utilize the cooling effect of the air stream. This would mean that hot oil is disadvantageously conducted past the combustion engine, whereby a huge risk of fire results.

It is the object of the present disclosure to provide an improved cooling system of a mobile work machine of the category.

This object is achieved by a mobile work machine, in particular by a dump truck or by a truck, having a common cooling circuit comprising a liquid cooling medium for the parallel cooling of one or more components of the power electronics of the diesel electric drive and for the cooling of one or more drive components in the region of the driven vehicle axle. The required circulation path of the liquid cooling medium is reduced to a minimum by the use of a common cooling circuit. An effective cooling effect can be achieved by the shortened flow paths. At the same time, the total complexity of the work machine is reduced since no separate cooling systems have to be provided and serviced.

Water or glycol can be considered as the used cooling medium, for example.

The one or more components of the driven vehicle axle to be driven are, for example, one or more electrical drive motors of the diesel electric drive which, for example, drive the tires of the driven axle in pairs. The rear axle is typically the driven axle of the mobile work machine.

It is conceivable that the electrical drive motors drive their associated axial section or the wheel hubs of the driven vehicle axle in a speed transformed manner via suitable transmissions 75. The transmission oil used can likewise be coolable by the common cooling circuit. One or more planetary transmissions which are each integrated into the wheel hubs and which transfer the output moment of the electric motors to the wheel axle or wheel hub are frequently used as such transmissions.

The cooling of the transmission oil can be realized by means of one or more oil coolant heat exchangers. The required heat exchangers are, for example, arranged close to the transmission to keep the line path of the transmission oil as short as possible. An arrangement is conceivable in the region of the driven vehicle axle or in the region between the driven axle and the power electronics or, optionally, in the region between the generator and the power electronics. Cooling liquid of the common cooling circuit thus flows through the electric motors used, on the one hand, and through the one or more transmissions, in particular planetary transmissions, i.e. the heat exchangers used, on the other hand.

The advantageous arrangement of the heat exchangers makes a supply of the hot transmission oil from the driven rear axle up to the front region of the vehicle superfluous; the risk that the conveyed oil ignites is reduced.

One or more of the components of the power electronics to be cooled are, for example, one or more frequency converters for controlling the one or more electric motors of the driven vehicle axle. The generator of the diesel electric drive used is also understood as a component to be cooled in this connection. The one or more components of the power electronics are flowed through by the cooling liquid of the common cooling circuit in a known manner and are effectively cooled down.

The circulation may take place within the coolant circuit such that components having a higher cooling requirement are cooled or flowed through with priority, whereas components having a smaller cooling requirement are arranged downstream in the cooling circuit. The components of the power electronics, for example, have to be cooled down a lot more or require a lower temperature of the coolant since the regular operating temperature of the component is lower.

The transmission oil used of the one or more transmissions to be cooled is, in contrast, less demanding and less in need of cooling so that the temperature of the coolant can be higher for a sufficient cooling. It is proposed for this reason in accordance with an advantageous embodiment of the present disclosure that the cooling medium of the common cooling circuit first cools or flows through those components of the power electronics, such as the frequency converters, and/or the electric motors of the driven axle and is supplied subordinately to the one or more heat exchangers for cooling the transmission oil of the transmission types used in the driven vehicle axle.

The common coolant circuit is optionally configured such that at least some of the components to be cooled having similar cooling demands are cooled or flowed through in parallel. Provision can be made, for example, that the components of the power electronics and/or at least one of the electric drive motors is/are cooled or flowed through in parallel by the cooling medium of the common cooling circuit, whereas the one or more transmissions of the driven vehicle axle are cooled or flowed through subordinately.

In an example embodiment of the present disclosure, the cooling medium is conducted through a liquid cooler arranged as a heat sink in the front region of the work machine and is led from there via one or more pumps in the direction of the components to be cooled in the rear region.

Further advantages and properties of the present disclosure result from the embodiment shown in the Figures.

DETAILED DESCRIPTION

A dump truck 10 is shown in FIGS. 1 to 4. It is here a so-called large dump truck such as is used in ore mines. Front wheels 14 and rear wheels 16, driven via electric motors not shown in more detail, are supported at a rigid frame 12. The rear wheels 16 are designed with dual tires. The truck is shown on level ground 101 with vertical being as illustrated with respect to gravity and the horizontal level ground on which the vehicle is positioned. A forward direction is shown to the left of FIG. 1, with rearward being opposite of forward.

A skip 18 is pivotally connected to the frame 12 and is pivotable via hydraulic lifting cylinders 20 provided at both sides at the vehicle. The vehicle 10 is bounded by the bumper 22 in the region of the vehicle 10 at the front in the direction of travel. A cooler module 24 is arranged above the bumper 22. An upper deck 26 on which an operator's cabin 28 is arranged in turn extends over the width of the dump truck 10 above the cooler module 24. In the embodiment shown here, the operator's cabin 28 is positioned at the side of the upper deck 26 at the left in the direction of travel. The operator's cabin thus lies above the front left wheel 14.

Figure 1:
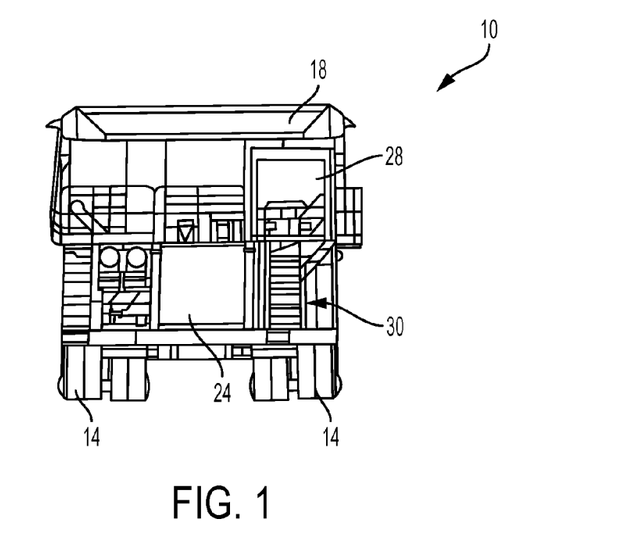
FIG. 1 shows a representation of the dump truck in accordance with the present disclosure.
Figure 2:
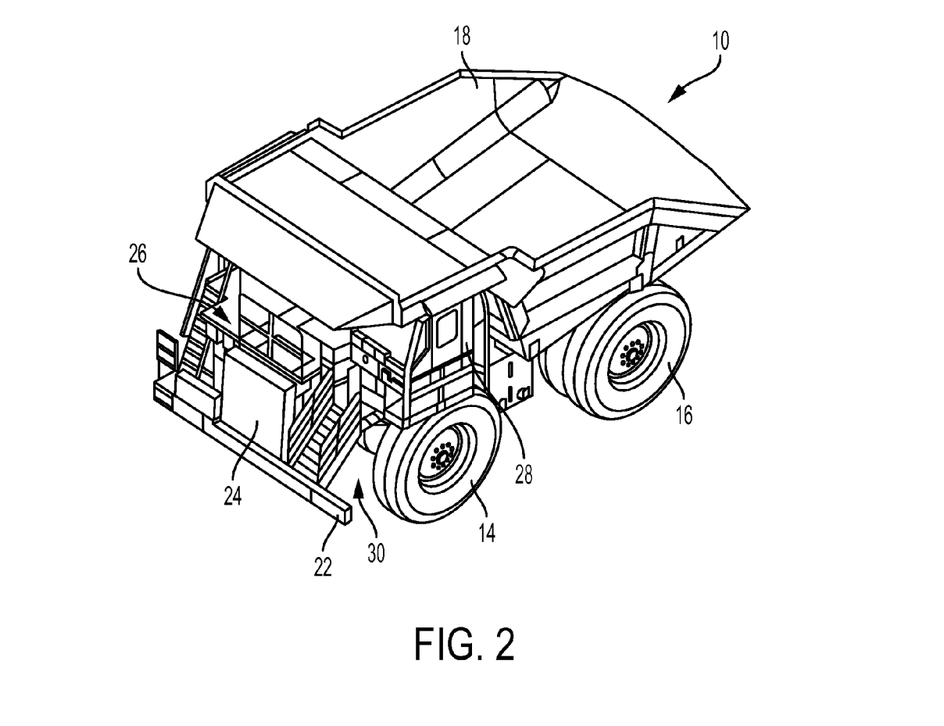
FIG. 2 shows another representation of the dump truck of FIG. 1.
Figure 3:
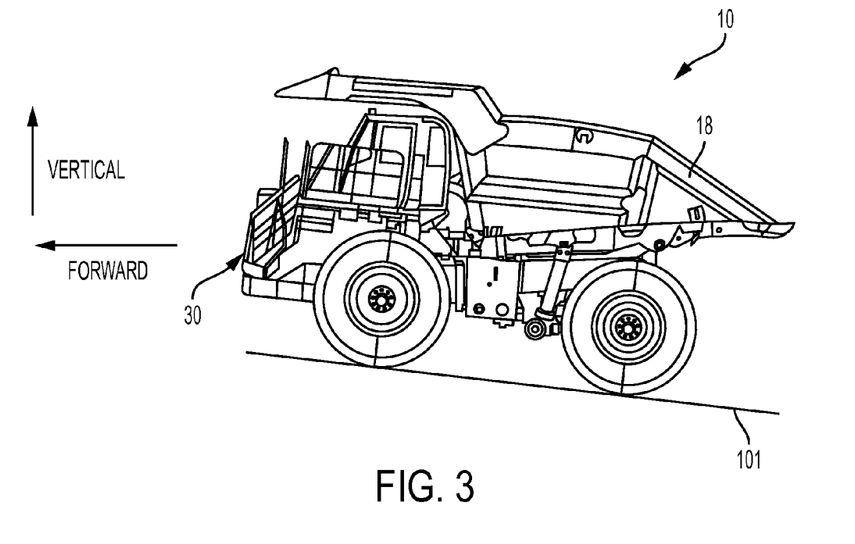
FIG. 3 shows another representation of the dump truck of FIG. 1.
Figure 4:
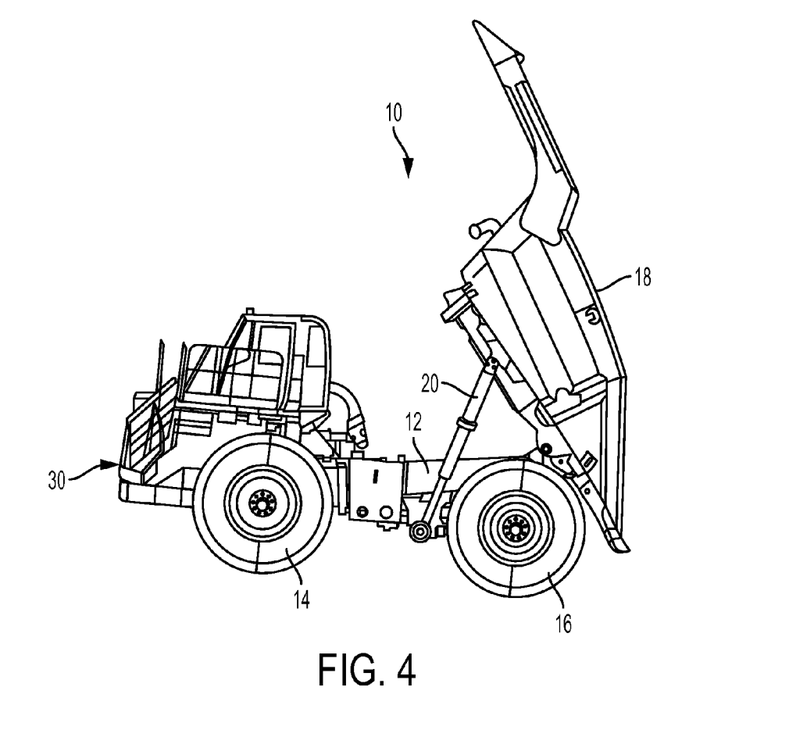
FIG. 4 shows another representation of the dump truck of FIG. 1.
Figure 5:
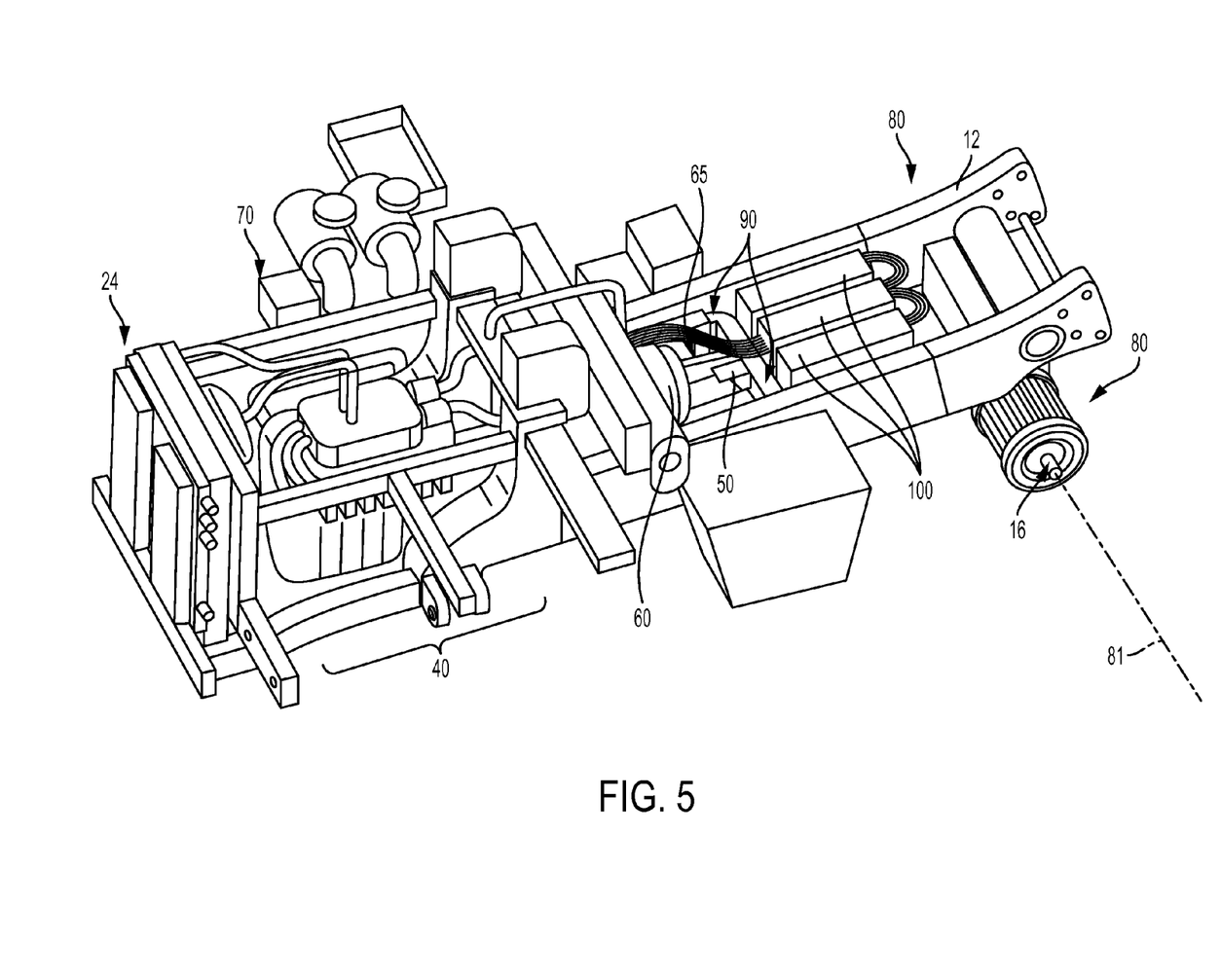
FIG. 5 shows a perspective detailed view, drawing approximately to scale (although other relative dimensions may be used if desired) of the vehicle frame of the dump truck of FIG. 1.

The dump truck 10 comprises a dielectric drive which is easily recognizable in the perspective detailed view of the vehicle frame 12 in FIG. 5. The drive comprises the diesel engine 40 which is mounted in the vehicle frame 12 in the front region viewed in the direction of travel. The internal combustion engine 40 is in particular seated in the region of the front axle 14 beneath the upper deck 26 and the operator's cabin 28. The cooler module 24 is seated directly in front of the internal combustion engine 40 at the vehicle front 30.

The internal combustion engine 40 drives the generator 60 mechanically to generate the required electrical energy for the electrical traction drives 80. Two AC motors 80, which are integrated to the left and right in the rear wheel axle 16 and sharing a common axle and motor axis 81, serve as the traction drive. Power electronics 100 with the required power components such as frequency converters, etc. are available for the control or regulation of the electric motors 80 and of the generator 60.

The two electric motors 80 drive the left and right wheel hubs of the driven rear axle 16 independently of one another. The drive takes place via a planetary transmission not shown in FIG. 5. Each electric motor 80 is connected to the wheel hub of the driven rear wheel axle 16 via a planetary transmission.

Both the power electronics 100 and the oil used of the planetary transmission have to be cooled during the operation of the dump truck 10. The new coolant circuit in accordance with the present disclosure is used for this purpose. The coolant circuit uses a liquid cooling medium, for example water or glycol, which is cooled down accordingly by the cooler module 24 as a heat sink. The cooling medium is conveyed via the cooling lines by means of one or more hydraulic pumps 65 into the rear part of the vehicle frame 12.

The one or more hydraulic pumps 65 are served by a power takeoff of the pump transfer case 50 which is seated directly at the generator output in the embodiment shown. The pump transfer case 50 at which the hydraulic pumps 65 are arranged is integrated into the cooling circuit. The transfer case 50 can, however, alternatively be arranged directly at the internal combustion engine 40 or at the generator 60 or between the generator 60 and the internal combustion engine 40.

The pump 65 conveys the hydraulic medium from the front side of the dump truck 10 in the direction of the power electronics 100 so that these components, in particular the frequency converters, are cooled or flowed through by the conveyed cooling medium and are cooled down to the desired operating temperature level. In addition, the coolant is supplied to the one or more water-oil heat exchangers 90, optionally one heat exchanger per planetary transmission, mounted in the region in front of the power electronics 100 viewed from the vehicle front 30 to cool the transmission oil used of the planetary transmissions in the driven rear wheel axle 16. For this purpose, the oil is conducted from the rear wheel axle 16 up to the heat exchangers 90. The coolant can furthermore be supplied to the electric motors 80 downstream of the transmission oil coolers.

The present disclosure discloses a single cooling circuit for the named components which extends from the front side of the vehicle frame 12 up to the vehicle rear. The circulation of the cooling medium is restricted to the frame region, with the short line paths allowing an effective cooling. The pressure compensation vessel 70 is additionally provided to compensate the temperature fluctuations of the cooling medium.

Figure 6:
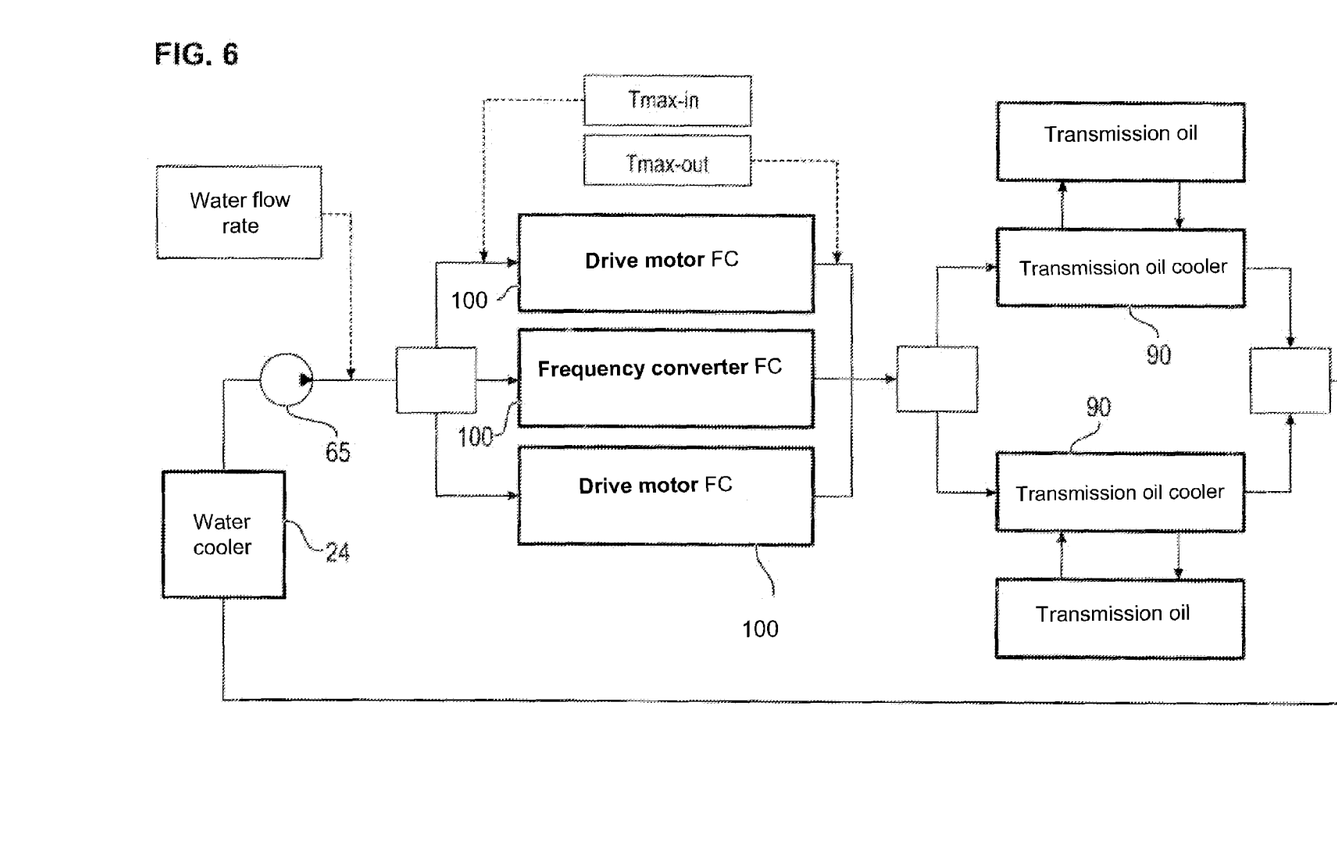
FIG. 6 shows a sketch-like circuit diagram illustration of the coolant circuit of the dump truck in of FIG. 1.

FIG. 6 shows a sketched illustration of the cooling circuit. The cooling medium used is conveyed from the cooling module 24 as a heat sink via the pump 65 in the direction of the power electronics 100 and of the heat exchangers 90. Since the frequency converters of the power electronics 100 require a lower temperature level for operation, less than 65° here, the medium cooled down by the cooling module 24 (temperature less than 55°) is primarily conveyed to these components 100.

After flowing through these heat sources, the cooling medium now has a higher temperature in the range of 65° which is sufficient for the cooling of the transmission oil. The heat exchangers 90 are consequently connected downstream of the power electronics 100 in the circulation flow of the cooling medium. The heat exchangers 90 are likewise flowed through in parallel with one another.

The design in accordance with the present disclosure allows a common cooling circuit for the components to be cooled so that the number of cooling circuit components, etc. is reduced and a sufficiently effective cooling is nevertheless provided.

In one example, being in the region of a component may include within the component and/or adjacent to the component, and/or within a threshold distance of the component such as within an outer envelope defined by the component, and/or as specified above herein and/or as specified in the figures.

Figure 7:
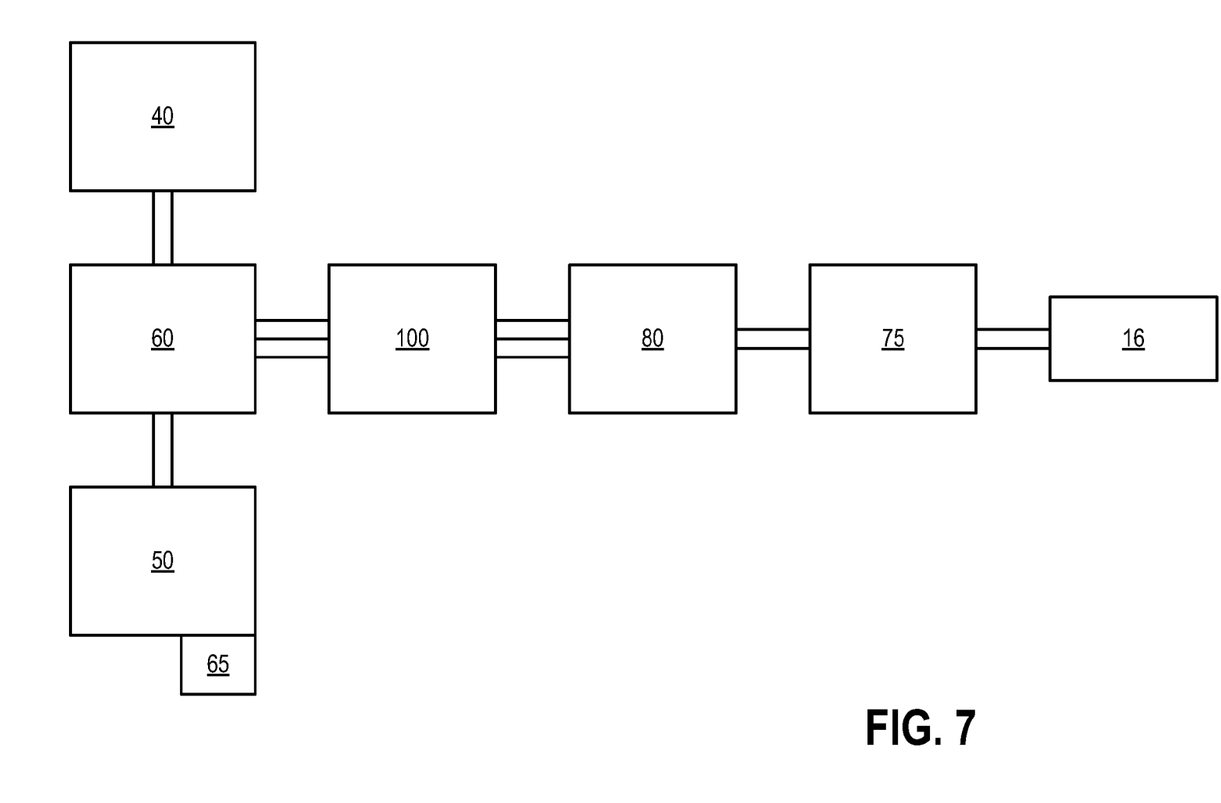
FIG. 7 shows an illustration of the vehicle drive system in accordance with the present disclosure.

FIG. 7 shows engine 40 mechanically driving generator 60, which as noted above may have a power take off 50 to drive pump 65. Electrical output from generator 60 is provided to power electronics 100 for conditioning and control of current and electrical power supplied to traction drive motor 80. Mechanical power generated by motor 80 is fed through transmission 75 to axle 16, and then to vehicle wheels to dive the vehicle, as described above herein.

The invention claimed is:

1. A mobile work machine, comprising:
   a diesel electric traction drive and a cooling system,
   wherein a common cooling circuit of a liquid cooling medium is provided for parallel cooling of one or more components of power electronics of the work machine and for cooling of one or more drive components in a region of a driven vehicle axle, and
   wherein circulation of coolant in the cooling circuit takes place such that components to be cooled having a higher cooling requirement are primarily cooled or flowed through, whereas components having a lower cooling requirement are arranged downstream in the cooling circuit.

2. The mobile work machine in accordance with claim 1, wherein the components to be cooled in the region of the driven vehicle axle are one or more electric drive motors for driving the vehicle axle.

3. The mobile work machine in accordance with claim 1, wherein the components to be cooled in the region of the driven vehicle axle are one or more transmissions, by which torque of one or more electric motors is transferred to the vehicle axle or to a wheel hub.

4. The mobile work machine in accordance with claim 3, wherein cooling power of coolant of the cooling circuit is emitted to transmission oil of the one or more transmissions via one or more heat exchangers, with the heat exchangers being arranged at or in the region of the driven vehicle axle.

5. The mobile work machine in accordance with claim 1, wherein the one or more components of the power electronics are at least one or more frequency converters or a generator of the diesel electric traction drive.

6. The mobile work machine in accordance with claim 1, wherein the components having the higher cooling requirement comprise one or more components of the power electronics, whereas the components having the lower cooling requirement comprise one or more transmissions in the region of the driven vehicle axle.

7. The mobile work machine in accordance with claim 6, wherein the common cooling circuit is configured such that at least some of the components to be cooled of the power electronics are cooled or flowed through in parallel by the cooling medium of the common cooling circuit, whereas the one or more transmissions of the driven vehicle axle are cooled or flowed through subordinately.

8. The mobile work machine in accordance with claim 1, wherein the cooling medium flows through a cooling module arranged as a heat sink in a front region of the work machine and is conveyed from there via one or more pumps in a direction of components to be cooled in a region of a vehicle rear.

9. The mobile work machine in accordance with claim 1, wherein the region of the driven vehicle axle includes one or more of being located vertically or horizontally between vehicle rails, the driven vehicle axle positioned vertically below the rails and electrically coupled to the power electronics.

10. A mobile work machine, comprising:
    a diesel electric traction drive,
    a liquid cooling system, and
    a common cooling circuit of a liquid cooling medium structured with a parallel positioning of one or more components of power electronics of the work machine and one or more drive components positioned in a region of a driven vehicle axle,
    wherein the one or more drive components includes a traction drive motor, wherein the power electronics are electrically coupled to the traction drive motor to power the diesel electric traction drive for vehicle travel, and wherein the traction drive motor is mechanically coupled to the driven vehicle axle to drive a vehicle and move the vehicle along a surface on which the vehicle travels, and
    wherein the power electronics are positioned between two vehicle rails of the work machine, and wherein the traction drive motor is positioned below the two vehicle rails.

11. The mobile work machine in accordance with claim 10, wherein the power electronics are vertically positioned within a vertical thickness of the rails without extending below or above respective bottom surfaces and top surfaces of the rails, and wherein two traction drive motors are provided, one at least partially extending on each outer side of the rails along an axle and a motor axis.

12. The mobile work machine in accordance with claim 10, wherein the one or more drive components includes a transmission by which torque of one or more electric motors is transferred to the vehicle axle or to a wheel hub, the transmission coupled to a heat exchanger in the cooling circuit.

13. The mobile work machine in accordance with claim 12, wherein cooling power of coolant of the cooling circuit is emitted to transmission oil of the transmission with the heat exchanger being arranged between the two vehicle rails of the work machine, and wherein the traction drive motor is positioned below the rails.

14. The mobile work machine in accordance with claim 13, wherein the one or more components of the power electronics are at least one or more frequency converters or a generator of the diesel electric traction drive.

15. The mobile work machine in accordance with claim 10, wherein the cooling medium flows through a cooling module arranged as a heat sink in a front region of the work machine and is conveyed from there via one or more pumps in a direction of components to be cooled in a rear of the work machine.

16. The mobile work machine in accordance with claim 10, wherein the region of the driven vehicle axle includes one or more of being located vertically or horizontally between the vehicle rails, the driven vehicle axle coupled below the rails.

17. A mobile work machine, comprising:
a diesel electric traction drive and a cooling system, wherein a common cooling circuit of a liquid cooling medium is provided for parallel cooling of one or more components of power electronics of the work machine and for cooling of one or more drive components in a region of a driven vehicle axle,
wherein the components to be cooled in the region of the driven vehicle axle are one or more transmissions, by which torque of one or more electric motors is transferred to the driven vehicle axle or to a wheel hub, and
wherein cooling power of coolant of the cooling circuit is emitted to transmission oil of the one or more transmissions via one or more heat exchangers, with the heat exchangers being arranged at or in the region of the driven vehicle axle.

18. A mobile work machine, comprising:
a diesel electric traction drive and a cooling system, wherein a common cooling circuit of a liquid cooling medium is provided for parallel cooling of one or more components of power electronics of the work machine and for cooling of one or more drive components in a region of a driven vehicle axle,
wherein the region of the driven vehicle axle includes one or more of being located vertically or horizontally between vehicle rails, the driven vehicle axle positioned vertically below the vehicle rails and electrically coupled to the power electronics.

19. A mobile work machine, comprising:
a diesel electric traction drive,
a liquid cooling system, and
a common cooling circuit of a liquid cooling medium structured with a parallel positioning of one or more components of power electronics of the work machine and one or more drive components positioned in a region of a driven vehicle axle,
wherein the one or more drive components includes a transmission by which torque of one or more electric motors is transferred to the driven vehicle axle or to a wheel hub, the transmission coupled to a heat exchanger in the cooling circuit, and
wherein cooling power of coolant of the cooling circuit is emitted to transmission oil of the transmission with the heat exchanger being arranged between two vehicle rails of the work machine, and wherein a traction drive motor is positioned below the two vehicle rails.

20. A mobile work machine, comprising:
a diesel electric traction drive,
a liquid cooling system, and
a common cooling circuit of a liquid cooling medium structured with a parallel positioning of one or more components of power electronics of the work machine and one or more drive components positioned in a region of a driven vehicle axle,
wherein the one or more drive components includes a transmission by which torque of one or more electric motors is transferred to the driven vehicle axle or to a wheel hub, the transmission coupled to a heat exchanger in the cooling circuit,
wherein cooling power of coolant of the cooling circuit is emitted to transmission oil of the transmission with the heat exchanger being arranged between two vehicle rails of the work machine, and wherein a traction drive motor is positioned below the two vehicle rails, and
wherein the one or more components of the power electronics are at least one or more frequency converters or a generator of the diesel electric traction drive.

21. A mobile work machine, comprising:
a diesel electric traction drive,
a liquid cooling system, and
a common cooling circuit of a liquid cooling medium structured with a parallel positioning of one or more components of power electronics of the work machine and one or more drive components positioned in a region of a driven vehicle axle,
wherein the region of the driven vehicle axle includes one or more of being located vertically or horizontally between vehicle rails, the driven vehicle axle coupled below the vehicle rails.

* * * * *